(12) United States Patent
Iida

(10) Patent No.: US 7,656,598 B2
(45) Date of Patent: Feb. 2, 2010

(54) METHOD AND APPARATUS FOR SETTING STORAGE CAPACITY OF RECORDING MEDIA

(75) Inventor: Atsuo Iida, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 536 days.

(21) Appl. No.: 11/505,509

(22) Filed: Aug. 17, 2006

(65) Prior Publication Data

US 2007/0217054 A1    Sep. 20, 2007

(30) Foreign Application Priority Data

Mar. 15, 2006   (JP) ............................ 2006-070399

(51) Int. Cl.
*G11B 27/36*   (2006.01)
(52) U.S. Cl. ............................. 360/31; 360/75; 360/60
(58) Field of Classification Search .................. None
See application file for complete search history.

(56) References Cited

U.S. PATENT DOCUMENTS

| | | | |
|---|---|---|---|
| 5,369,533 A | 11/1994 | Ottesen et al. ............... 360/51 |
| 5,541,737 A * | 7/1996 | Oguro et al. ................. 386/96 |
| 5,596,458 A | 1/1997 | Emo et al. .................... 360/48 |
| 5,870,237 A | 2/1999 | Emo et al. .................... 360/48 |
| 5,946,153 A | 8/1999 | Emo et al. .................... 360/48 |
| 6,005,725 A | 12/1999 | Emo et al. .................... 360/31 |
| 6,061,195 A | 5/2000 | Wilson et al. ................. 360/48 |
| 6,084,732 A * | 7/2000 | Lee ............................. 360/53 |
| 6,091,559 A | 7/2000 | Emo et al. .................... 360/48 |
| 6,260,257 B1 | 7/2001 | Emo et al. ............... 29/603.09 |
| 6,611,395 B1 | 8/2003 | Chainer et al. ................ 360/75 |
| 7,046,471 B2 * | 5/2006 | Meyer et al. ................. 360/75 |
| 7,196,860 B2 * | 3/2007 | Alex ........................... 360/31 |
| 7,392,439 B2 * | 6/2008 | Seng et al. .................. 714/704 |
| 2003/0151950 A1 * | 8/2003 | Tamada et al. .......... 365/185.19 |
| 2004/0225933 A1 | 11/2004 | Seng et al. |

FOREIGN PATENT DOCUMENTS

| | | |
|---|---|---|
| JP | 02-260103 | 10/1990 |
| JP | 06-231537 | 8/1994 |
| JP | 08-255412 | 10/1996 |
| JP | 2002-237142 | 8/2002 |

* cited by examiner

Primary Examiner—Jason C Olson
(74) Attorney, Agent, or Firm—Greer, Burns & Crain, Ltd.

(57) ABSTRACT

A recording density of a recording medium is set by establishing a predetermined relationship between guaranteed write/erase endurance values and recording density values for the recording medium, and then selecting a required guaranteed write/erase endurance. A recording density value corresponding to the required guaranteed write/erase endurance is determined from the predetermined relationship, and the recording density of the recording medium set based on the determined recording density value.

23 Claims, 9 Drawing Sheets

METHOD AND APPARATUS FOR SETTING STORAGE CAPACITY OF RECORDING MEDIA

FIELD OF THE INVENTION

The present invention generally relates to data storage methods, and more particularly to methods and apparatus for setting the recording capacity of recording media based on the usage of the media.

BACKGROUND OF THE INVENTION

There are constant demands to increase the storage capacity of magnetic disk drives, which are used as storage units for computer systems and various kinds of electronic apparatus. In general, the magnetic disk drives are developed and designed with the goal of increasing the storage capacity.

In order to increase the storage capacity of a magnetic disk drive, it is necessary to increase the recording density of the magnetic disk. Known methods for increasing the recording density on a magnetic disk include increasing the density of the tracks along a radial direction of the magnetic disk (i.e., increasing the tracks per inch (TPI)), and/or increasing the density along the direction of the track (i.e., increasing the bits per inch (BPI)). Varying the track width of the magnetic disk at the inner periphery and the outer periphery of the magnetic disk, or depending on the width of the head, has also been proposed.

In addition to the demands for increased storage capacity, there are also demands for guarantee of large write/erase endurance. A "guaranteed write/erase endurance" refers to the guaranteed number of times data can be rewritten on the same position on a magnetic recording medium such as a magnetic disk.

When the track density on the magnetic disk is increased, the adjacent tracks become extremely close to each other, and if the recording head makes a recording or erasure with respect to one track, the adjacent tracks may also be affected. In a worst case, a significant portion or all of the adjacent track may get rewritten or erased. The adjacent track is affected by the recording or erasure because of the spread of the magnetic field of the recording head, and because the position of the recording head may become offset from the desired track position due to vibration and air flow.

For these reasons, it is difficult to guarantee a large write/erase endurance and also increase the track density. Consequently, a realization of a magnetic disk drive that is both inexpensive and has a large storage capacity has been difficult.

SUMMARY OF THE INVENTION

The present invention relates to methods and apparatus for setting the recording density of a recording medium, and includes establishing a predetermined relationship between guaranteed write/erase endurance values and recording density values for the recording medium. A required guaranteed write/erase endurance for the recording medium is selected and a recording density value corresponding to the required guaranteed write/erase endurance is determined from the predetermined relationship. The recording density of the recording medium is then set based on the determined recording density value.

DETAILED DESCRIPTION OF THE PREFERED EMBODIMENTS

In the present invention, the recording density of a recording medium is set based on the guaranteed write/erase endurance, and information is recorded on the recording medium with respect to the set recording density. If the guaranteed write/erase endurance is relatively small, the recording density of the recording medium is increased by a corresponding amount so as to increase the storage capacity. On the other hand, if the guaranteed write/erase endurance is relatively large, the recording density of the recording medium is decreased. In this manner, it is possible to realize an information storage apparatus that is inexpensive and has a large storage capacity.

Figure 1:
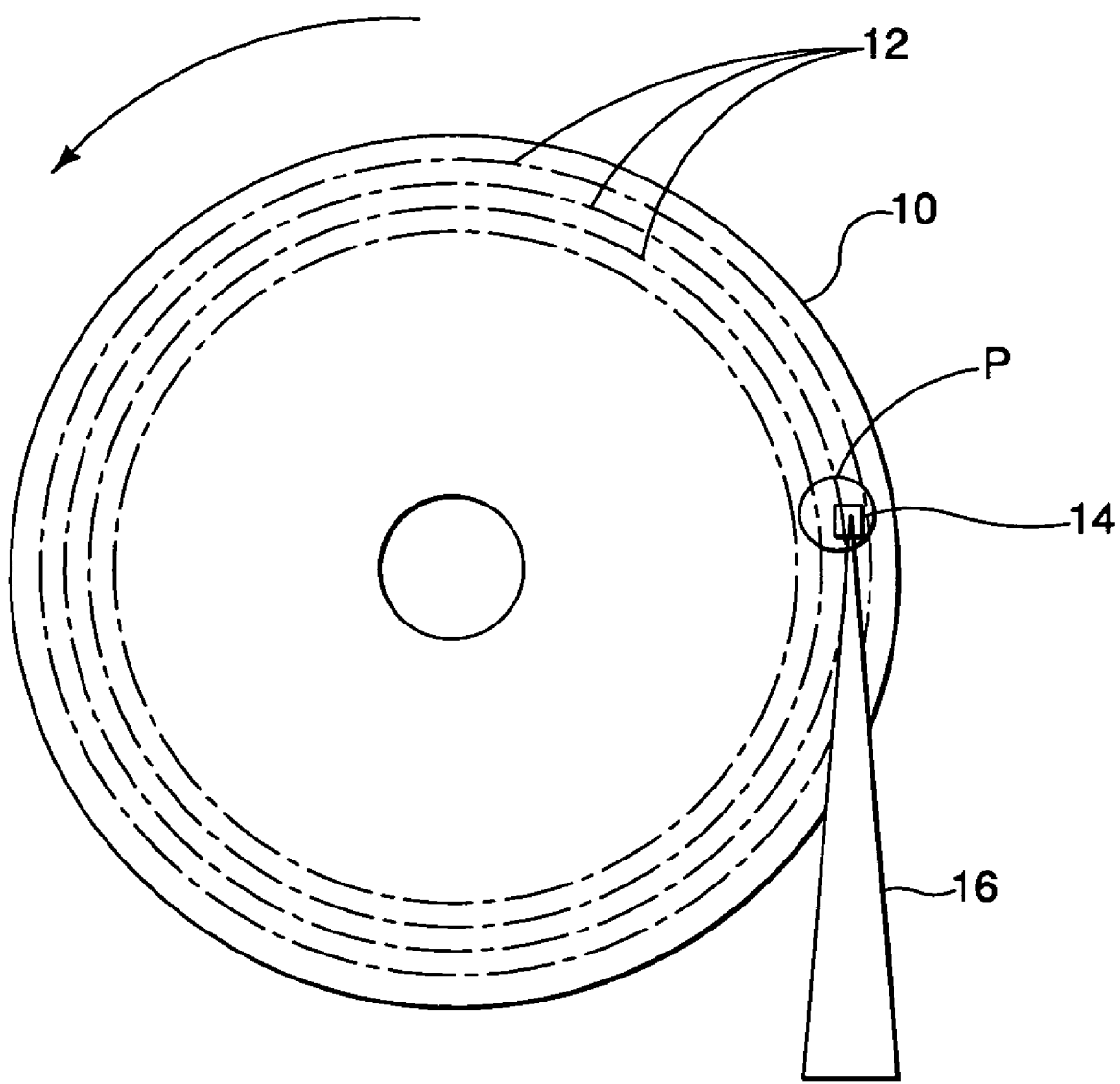
FIG. 1 is a plan view showing a magnetic disk.

Turning now to FIG. 1, a magnetic disk 10 is shown, which is one example of a recording medium. Concentric tracks (or spiral track turns) 12 are formed on the magnetic disk 10 employing a perpendicular magnetic recording technique by a head part 14 provided on a tip end of an arm 16.

Figure 2:
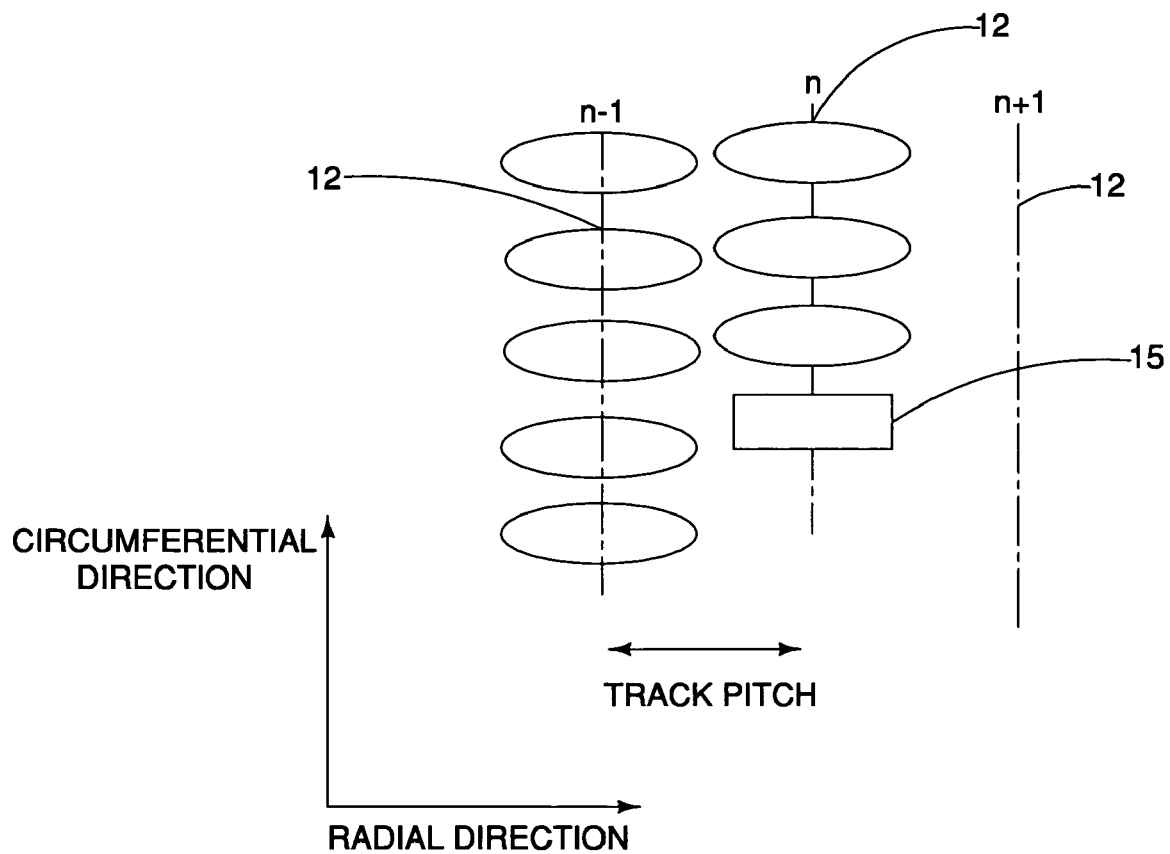
FIG. 2 is a diagram showing a portion of the magnetic disk shown in FIG. 1 on an enlarged scale.

As illustrated in FIG. 2, which shows a portion P on the magnetic disk 10, the distance between the centerlines of two mutually adjacent tracks 12 along a radial direction is called a track pitch. One way to increase the recording density of the magnetic disk 10, is to increase the density of the tracks 12 along the radial direction (TPI). Another way is to increase the density of the tracks 10 along a circumferential direction (BPI).

Figure 3:
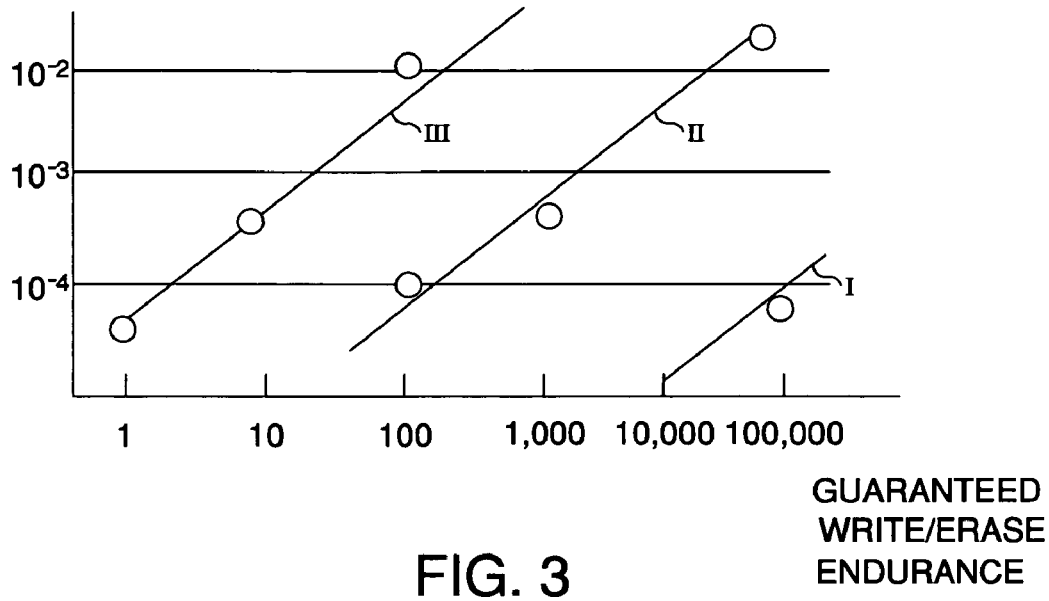
FIG. 3 is a diagram showing the relationship between error rate and guaranteed write/erase endurance.

Since a recording head 15 (shown in FIG. 2) of the head part 14 that records information on the magnetic disk 10 has a constant width, patterns that are written on the magnetic disk also have a constant width. For this reason, when a track number n-1 is recorded and an adjacent track number n is recorded thereafter, a phenomenon may occur in which the information of the track having the track number n-1 is rewritten or erased FIG. 3 is a diagram showing the relationship between error rate and guaranteed write/erase endurance, with respect to different track pitches. The abscissa indicates the guaranteed write/erase endurance for the track number n on a logarithmic scale, and the ordinate indicates the deterioration of the signal recorded on the track number n-1 as error rate (arbitrary units). Curves I, II and III respectively show cases where the track pitch is 0.3 μm, 0.2 μm and 0.15 μm. When it is assumed that the required error rate is $10^{-4}$ or less (that is, the generation of the error is once or less in 10,000 times), and an attempt is made to set the guaranteed write/erase endurance to 100,000 times or greater, for example, it can be seen that the track pitch cannot be made less than or equal to 0.3 μm. On the other hand, from the curve II (for the case where the track pitch is 0.2 μm), it was found that the track pitch can be narrowed to 0.2 μm if the guaranteed write/erase endurance is limited to approximately 100 times.

In other words, if the guaranteed write/erase endurance is limited to approximately 100 times, the recording density along the radial direction of the magnetic disk 10 can be made approximately 1.5 times greater, so as to make the storage capacity of the entire magnetic disk approximately 1.5 times greater. Similarly, from curve III for the case where the track pitch is 0.15 μm, it can be seen that the storage capacity of the entire magnetic disk 10 can be made approximately 2 times greater by limiting the guaranteed write/erase endurance to 1 time (once) when compare to the case where the guaranteed write/erase endurance is set to 100,000 times or greater.

Figure 4:
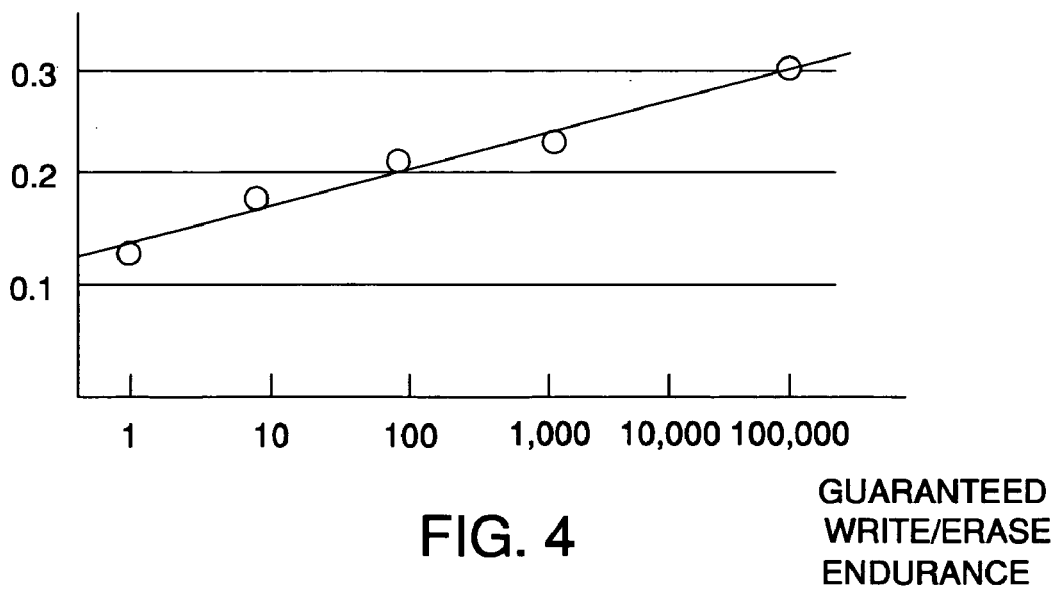
FIG. 4 is a diagram showing the relationship between track pitch and guaranteed write/erase endurance.

FIG. 4 is a diagram showing the relationship between track pitch and guaranteed write/erase endurance. The ordinate indicates the track pitch (μm), and the abscissa indicates the guaranteed write/erase endurance on a logarithmic scale. As shown FIG. 4, the track pitch is approximately proportional to the guaranteed write/erase endurance. In other words, it is possible to improve the TPI, that is, the recording density, by reducing the guaranteed write/erase endurance.

There are two primary reasons why the track pitch can be narrowed when the guaranteed write/erase endurance is reduced. One reason is the spreading of the magnetic field of the recording head 15. FIG. 2 shows the magnetization pattern at the time of one recording operation, but the magnetic field of the recording head 15 may spread more than as shown by this pattern. When the recording operation is carried out a number of times, the magnetization pattern spreads in a manner similar to the way ink would spread, and rewrites or erases information on the adjacent tracks. Another reason is the positional error of the recording head 15. The recording head 15 is provided at the tip end of the arm 16, and an error is introduced in the relative positions of the arm and the magnetic disk 10 due to the vibration caused by the rotation of a motor (not shown) that rotates the magnetic disk, and the air flow caused by the rotation of the magnetic disk. Since this error occurs at random, the possibility of rewriting or erasing information on the adjacent track increases as the guaranteed write/erase endurance increases.

Figure 5:
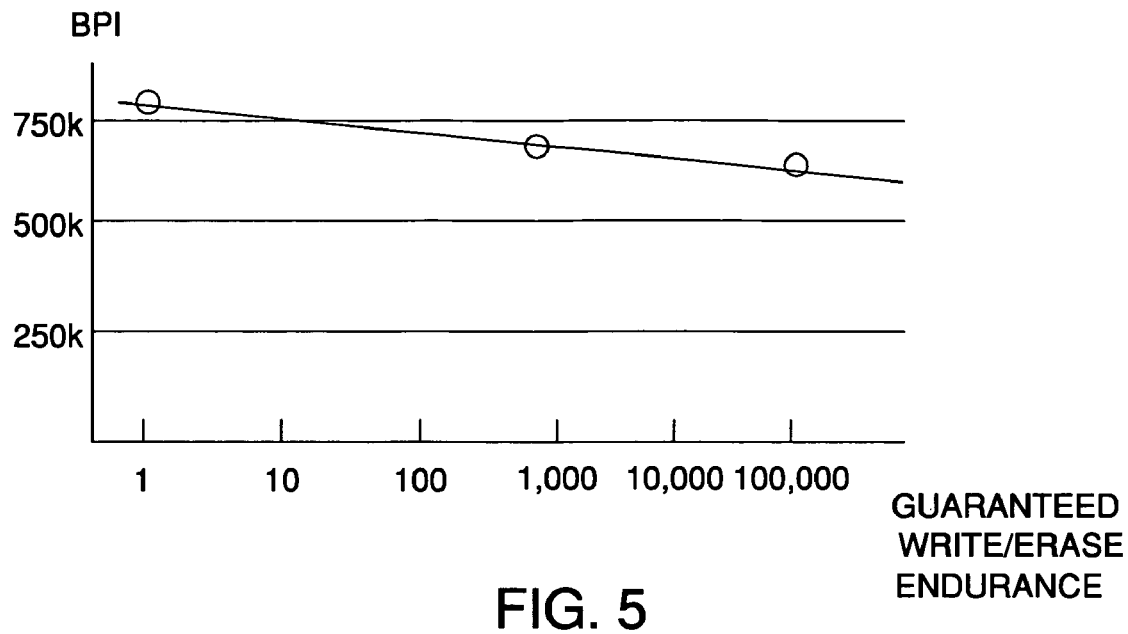
FIG. 5 is a diagram showing the relationship between bits per inch (BPI) and guaranteed write/erase endurance.

FIG. 5 is a diagram showing the relationship between the density in the circumferential or bit direction and the guaranteed write/erase endurance. The ordinate indicates the BPI, and the abscissa indicates the guaranteed write/erase endurance on a logarithmic scale. As shown, the BPI is approximately inversely proportional to the guaranteed write/erase endurance.

The reason why the BPI can be increased when the guaranteed write/erase endurance is reduced is different from the above described reason with respect to the TPI. In magnetic recording, when the rewriting of the same track is made, the recording pattern of the previous recording tends to remain slightly, even after the rewriting. Generally, when an attempt is made to increase the BPI, the write magnetic field inevitably becomes small and there is a tendency for the previous recording to remain, thereby limiting the increase in the BPI. For this reason, the BPI can be increased by reducing the guaranteed write/erase endurance.

Figure 6:
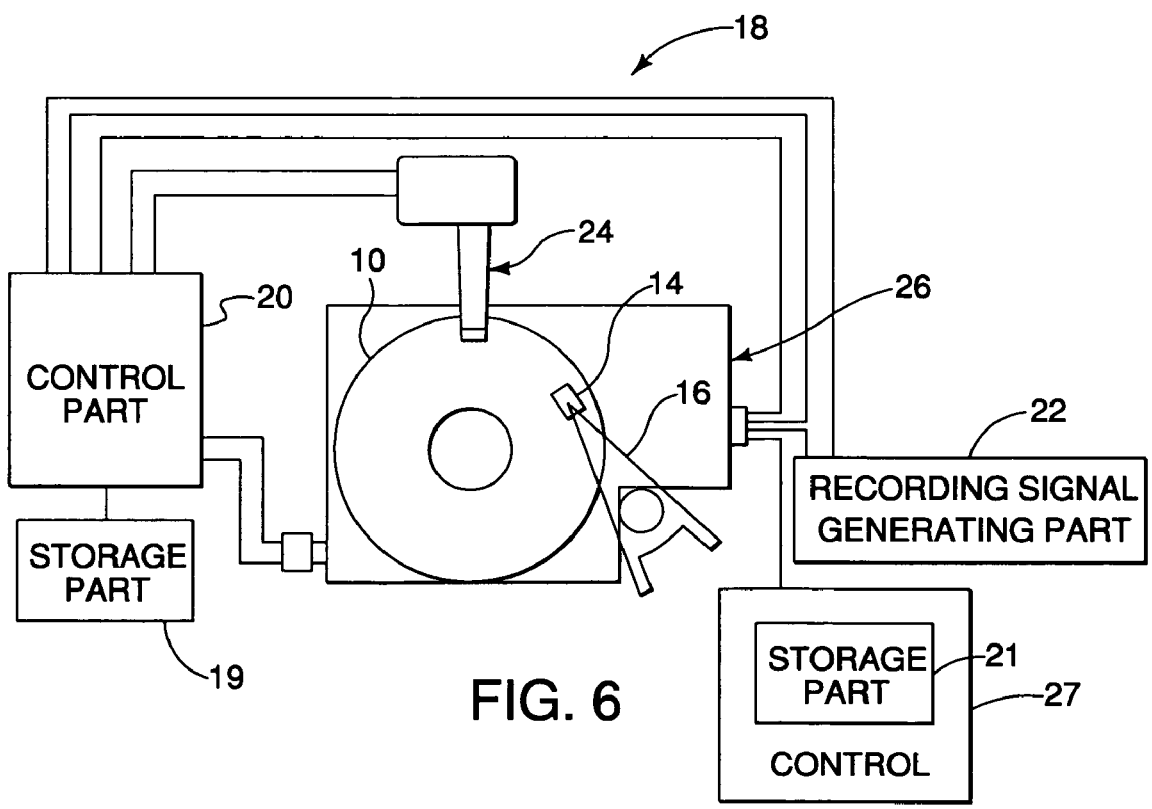
FIG. 6 is a diagram showing, in part, an information storage unit in accordance with one embodiment of the present invention.

Various embodiments of the present invention are possible depending on, the timing of when the guaranteed write/erase endurance is set and the recording density of the magnetic recording medium is changed. In one embodiment, the guaranteed write/erase endurance is set when carrying out the initial setting of the magnetic disk drive at the factory. FIG. 6 is a diagram showing the parts of an information storage apparatus in accordance with this embodiment of the present invention. The parts that correspond to those in FIG. 1 are designated by the same reference numerals, and a description thereof is omitted.

In this embodiment, the information storage apparatus is a servo track writer (STW) 18. The STW 18 includes a control part 20, a recording signal generating part 22 and a clock head 24. A magnetic disk drive 26 includes a magnetic disk 10, an arm 16, and a head part 14 made up of a the recording head 15 and a reproducing head 17 (shown in FIG. 7).

The magnetic disk drive 26 is connected to the STW 18, and servo information for detecting the position of the head part 14 on the magnetic disk 10 is recorded on the magnetic disk by the STW. The servo information is generated by the recording signal generating part 22, and is recorded on the magnetic disk 10 by the clock head 24 under the control of the control part 20. After the servo information is recorded on the magnetic disk 10, the magnetic disk drive 26 is disconnected from the STW 18, and the assembly completed after being combined with other parts, if necessary.

In this embodiment, the clock head 24 is used for recording the servo information because it is assumed that the initial setting of the magnetic disk drive 26 is made at the factory. However, the clock head 24 may be omitted, and instead, it is possible to directly control a driving part (not shown) of the head part 14 by the control part 20 and record the servo information on the magnetic disk 10 using the recording head 15 of the head part 14.

Figure 7:
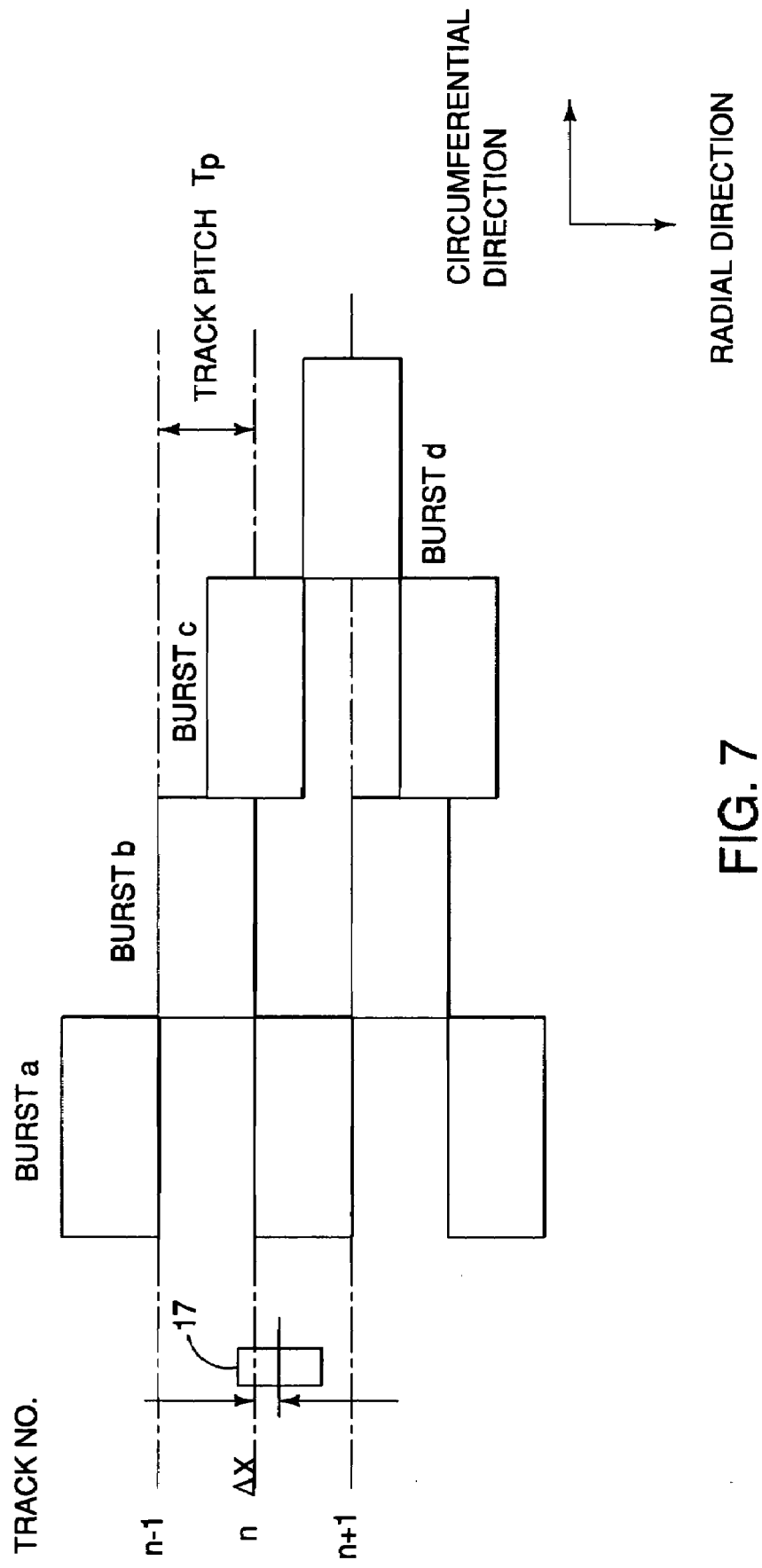
FIG. 7 is a diagram for explaining servo information recorded on a magnetic disk.
Figure 8:
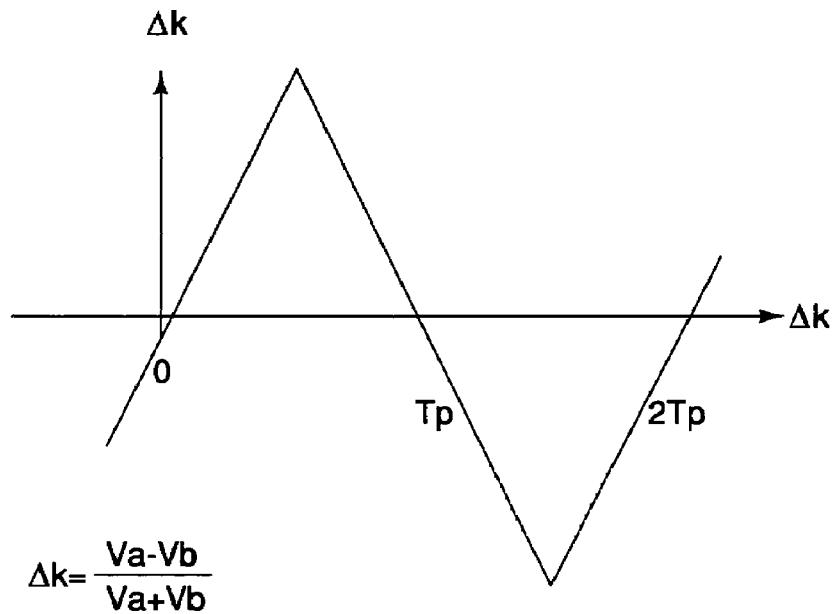
FIG. 8 is a diagram for explaining a method of detecting a head position.

As shown in FIG. 7, the servo information is recorded on the magnetic disk 10 as magnetization patterns of bursts a through d. The dotted lines indicate the centerlines of the tracks. As shown in FIG. 8, a position error amount ΔX (shown in FIG. 7) of the reproducing head 17 from a track number n may be detected by calculating $\Delta k = (Va-Vb)/(Va+Vb)$, where Va denotes the intensity of the signal that is reproduced when the reproducing head reproduces the burst a, and Vb denotes the intensity of the signal that is reproduced when the reproducing head reproduces the burst b. The detection accuracy of the position error of the reproducing head 17 may be improved by taking into consideration the intensities of the signals that are reproduced when the reproducing head reproduces the bursts c and d.

FIG. 7 shows a case where the pitch of the bursts a through c of the servo information along the radial direction (that is, the gap between two mutually adjacent bursts along the radial direction) and the track pitch Tp are the same. However, since the position of the reproducing head 17 can be detected continuously, it is not essential to set the two pitches to be the same. In other words, as long as the servo information patterns are formed on the magnetic disk 10 at the factory, it is possible to use this magnetic disk with an arbitrary track pitch regardless of the pitch and shape of the servo information patterns formed on this magnetic disk.

Hence, the recording density of the magnetic disk 10 is set based on the guaranteed write/erase endurance that is required by the magnetic disk drive 26 when carrying out the initial setting of the magnetic disk drive. The guaranteed write/erase endurance that is required by the magnetic disk drive 26 is determined by the usage of the magnetic disk drive, and thus, the recording density may be set based on the relationship between the track pitch and the guaranteed write/erase endurance shown in FIG. 4 and/or the relationship between the BPI and the guaranteed write/erase endurance shown in FIG. 5. In other words, the TPI and/or the BPI of the magnetic disk 10 is set depending on the guaranteed write/erase endurance.

More particularly, if the relationship shown in FIG. 4 and/or the relationship shown in FIG. 5 is stored in a storage part 19 (shown in FIG. 6) within the STW 18, the recording density of the magnetic disk 10 is set based on this relationship when the guaranteed write/erase endurance is input to the STW 18. In addition, if the relationship shown in FIG. 4 and/or the relationship shown in FIG. 5 are/is stored in a storage part 21 of the magnetic disk drive 26, the recording density of the magnetic disk 10 is set based on this relationship when the guaranteed write/erase endurance is input to the magnetic disk drive 26.

The storage part 19 within the STW 18 may be provided within or outside the control part 20. Similarly, the storage part 21 of the magnetic disk drive 26 may be provided within or outside a control part 27 of the magnetic disk drive. A write control circuit (LSI) of this embodiment may form the control part 20 of the STW 18, the control part 27 of the magnetic disk drive 26, or the control part of both the STW 18 and the control part within the magnetic disk drive 26.

According to this embodiment, if the required guaranteed write/erase endurance is relatively small, for example, it is possible to increase the storage capacity by increasing the recording density of the magnetic disk 10 by a corresponding amount. In other words, it is possible to secure a maximum storage capacity depending on the intended usage of the magnetic disk drive 26.

Figure 9:
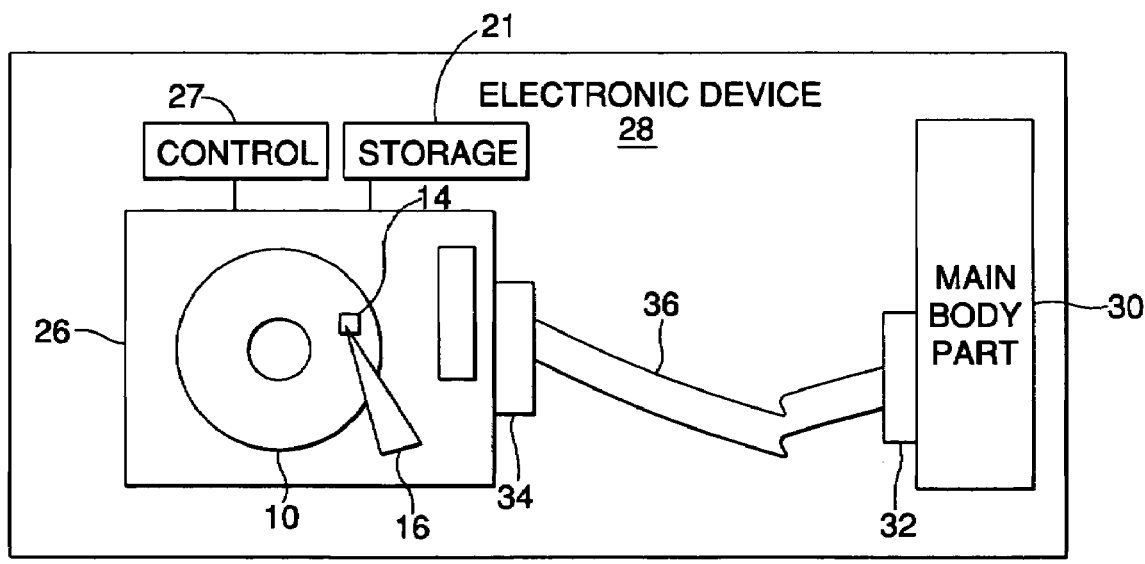
FIG. 9 is a diagram showing, in part, an information storage unit in accordance with another embodiment of the present invention.

In another embodiment of the present invention, the initial setting of the recording density is performed when the magnetic disk drive 26 is first installed in an electronic device, and the electronic device notifies the magnetic disk drive of the required guaranteed write/erase endurance. FIG. 9 is a diagram of an electronic device 28 illustrating this embodiment of the present invention. The parts that are the same as those in FIG. 6 are designated by the same reference numerals, and a description thereof is omitted.

The electronic device 28 shown in FIG. 9 may be a storage systems system such a PC or a RAID, a music recording and reproducing device, a video recording and reproducing device, for example. The electronic device 28 includes a main body part 30 having a connecting part 32, which is connected to a connecting part 34 of the magnetic disk drive 26 via a cable 36. Information is exchanged between the main body part 30 and the magnetic disk drive 26 via a standard interface such as, for example, ATA, CE-ATA, SCSI, SAS, FC or the like.

Figure 10:
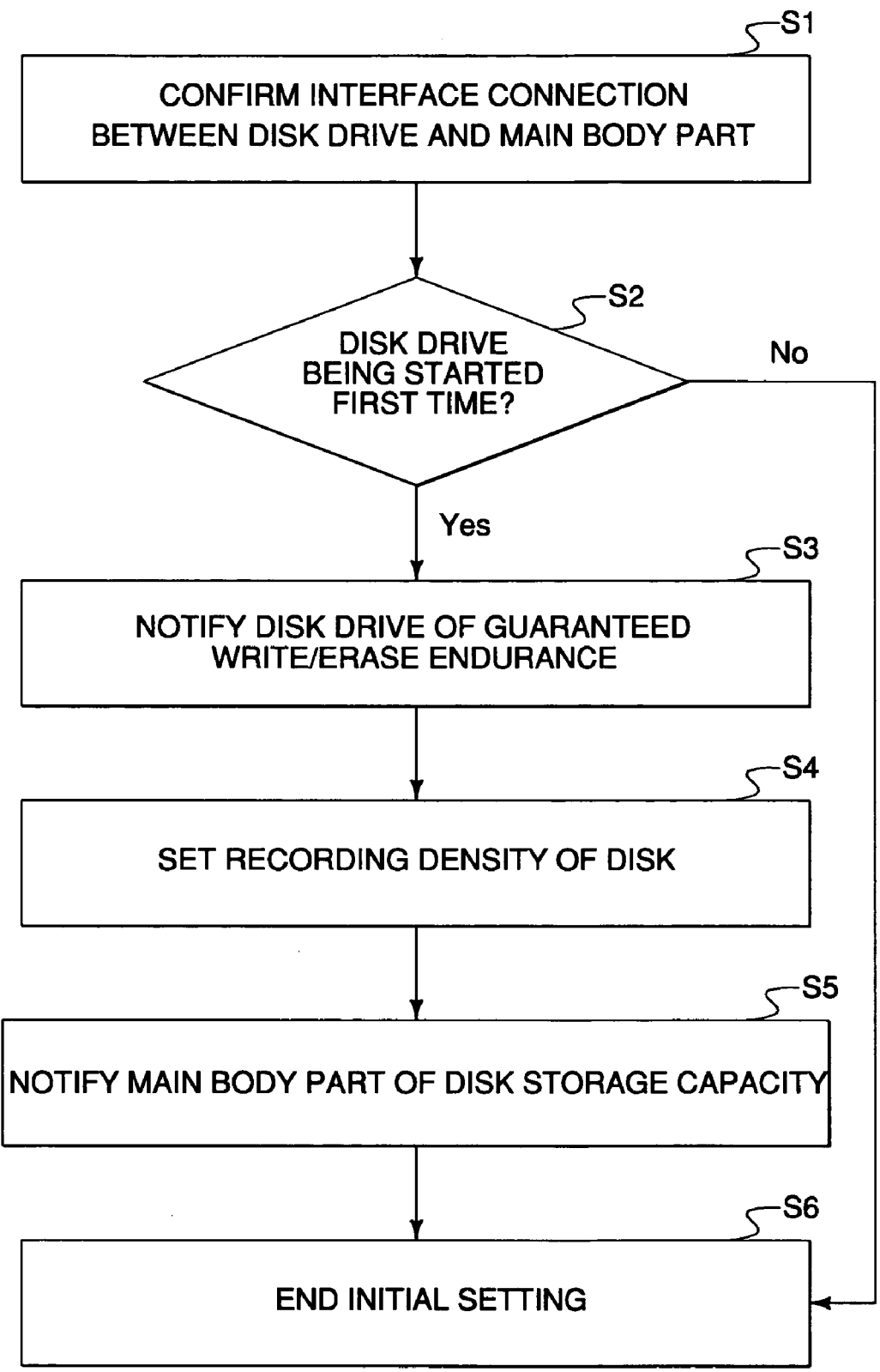
FIG. 10 is a flowchart for explaining an operation of the information storage unit of FIG. 9.

FIG. 10 is a flowchart for explaining the operation of this second embodiment. The process shown in FIG. 10 is carried out by a control part 27 which may be a CPU or a separate dedicated processor in the magnetic disk drive 26. In step S1, signal is transmitted and received to and from the main body part 30 using a standard interface to confirm that the magnetic disk drive 26 is connected to the main body part 30. In step S2, it is decides whether the magnetic disk drive 26 is started for the first time after being installed in the electronic device 28. If the decision result is NO, the process advances to a step S6, where the initial setting ends without setting the recording density of the disk 10.

On the other hand, if the decision result in the step S2 is YES, the main body part 30 notifies the magnetic disk drive 26 of the guaranteed write/erase endurance. The guaranteed write/erase endurance may be input to the main body part 30 from an operation part (not shown) of the electronic device 28, or preset within the main body part by a default setting. Since the relationship between the track pitch and the guaranteed write/erase endurance shown in FIG. 4 and/or the relationship between the BPI and the guaranteed write/erase endurance shown in FIG. 5 are/is stored in the storage part 21 of the magnetic disk drive 26, the recording density of the magnetic disk 10 is set in step S4 based on the stored relationship when the required guaranteed write/erase endurance is notified from the main body part 30. In step S5, the control part 27 of the magnetic disk drive 26 notifies the main body part 30 of the storage capacity of the magnetic disk 10 obtained by the set recording density, and the initial setting ends in step S6.

According to this embodiment, in the case where the guaranteed write/erase endurance is relatively small, for example, the recording density of the magnetic disk 10 can be increased by a corresponding amount to increase the storage capacity. Accordingly, it is possible to easily build the magnetic disk drive 26 that is suited for the usage within the electronic unit 28 or the like. In other words, it is possible to secure a maximum storage capacity depending on the usage of the magnetic disk drive 26.

Figure 11:
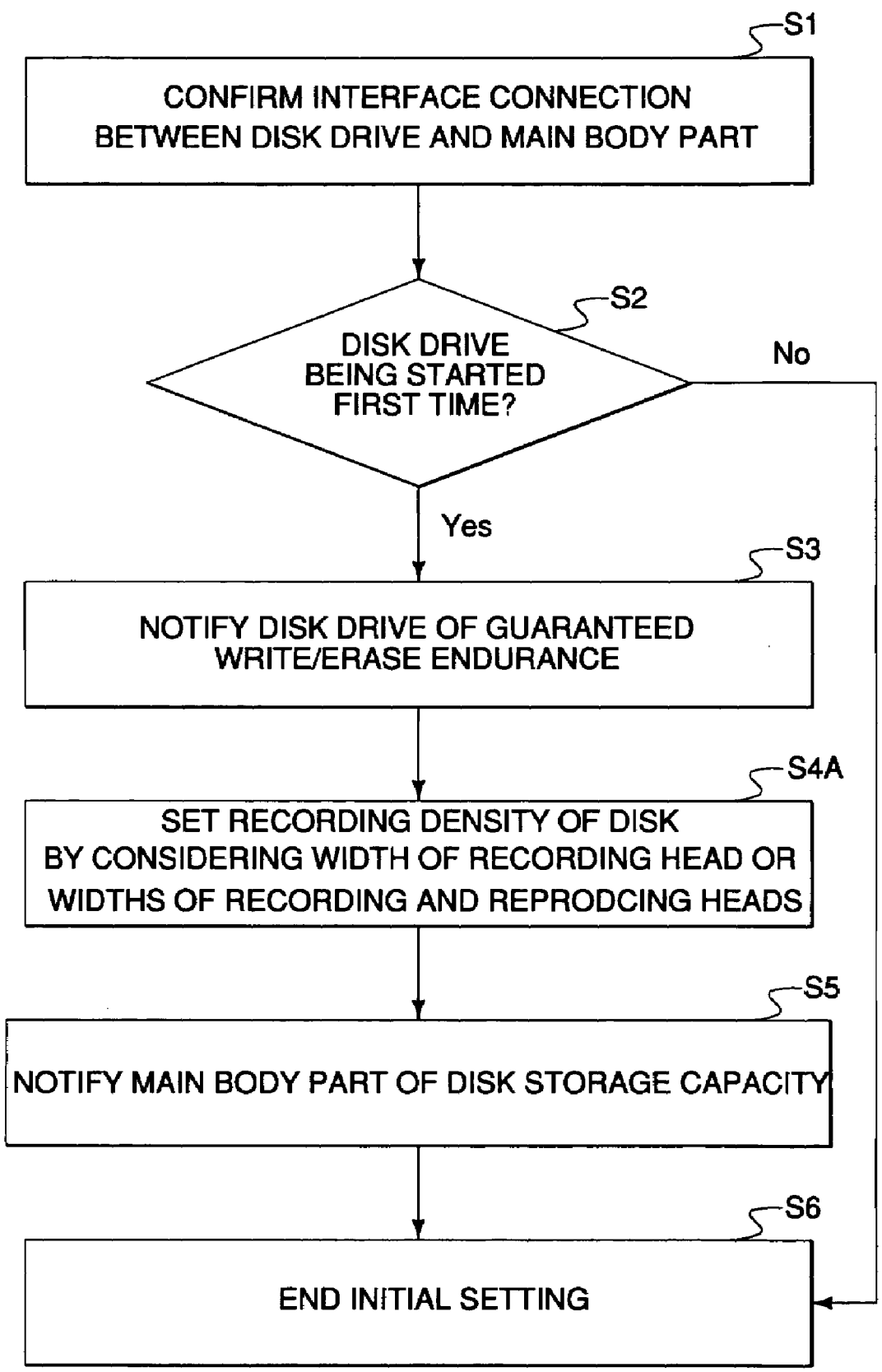
FIG. 11 is a flowchart for explaining another operation of the information storage unit of FIG. 9.

In accordance with another embodiment of the present invention, it is possible to secure the maximum storage capacity of the magnetic disk drive 26 depending on the usage of the electronic device 28. FIG. 11 is a flowchart for explaining the operation of this embodiment. The steps that are the same as those in FIG. 10 are designated by the same reference numerals, and a description thereof is omitted. In this embodiment, known methods for varying the track width depending on the width of the reproducing head 17 or the recording head 15, is applied to the present invention. In other words, information relating to the width of the recording head 15, or the widths of the recording head and the reproducing head 17, is stored in the storage part 21 of the magnetic disk drive 26, and the optimum recording density for the magnetic disk 10 is determined from this information when the guaranteed write/erase endurance is notified from the main body part 30.

In step S4A, when the magnetic disk drive 26 is notified of the required guaranteed write/erase endurance from the main body part 30, the magnetic disk drive provisionally determines the recording density of the magnetic disk 10 based on the guaranteed write/erase endurance. The magnetic disk drive 26 then optimizes the provisionally determined recording density based on the stored information relating to the width of the recording head 15 or the widths of the recording head and the reproducing head 17, so as to set the recording density of the magnetic disk 10 to the optimized recording density. More particularly, the recording density of the magnetic disk 10 is reduced if the width of the recording head increases, or the widths of the recording head and the reproducing head increase.

In the further embodiment of the present invention, the electronic device 28 in which the magnetic disk drive 26 is installed, notifies the magnetic disk drive of the required guaranteed write/erase endurance for setting the recording density based on the characteristics of the data to be processed. The characteristics of the data include parameters such as the data name, the data transfer rate and the data size, for example.

Figure 12:
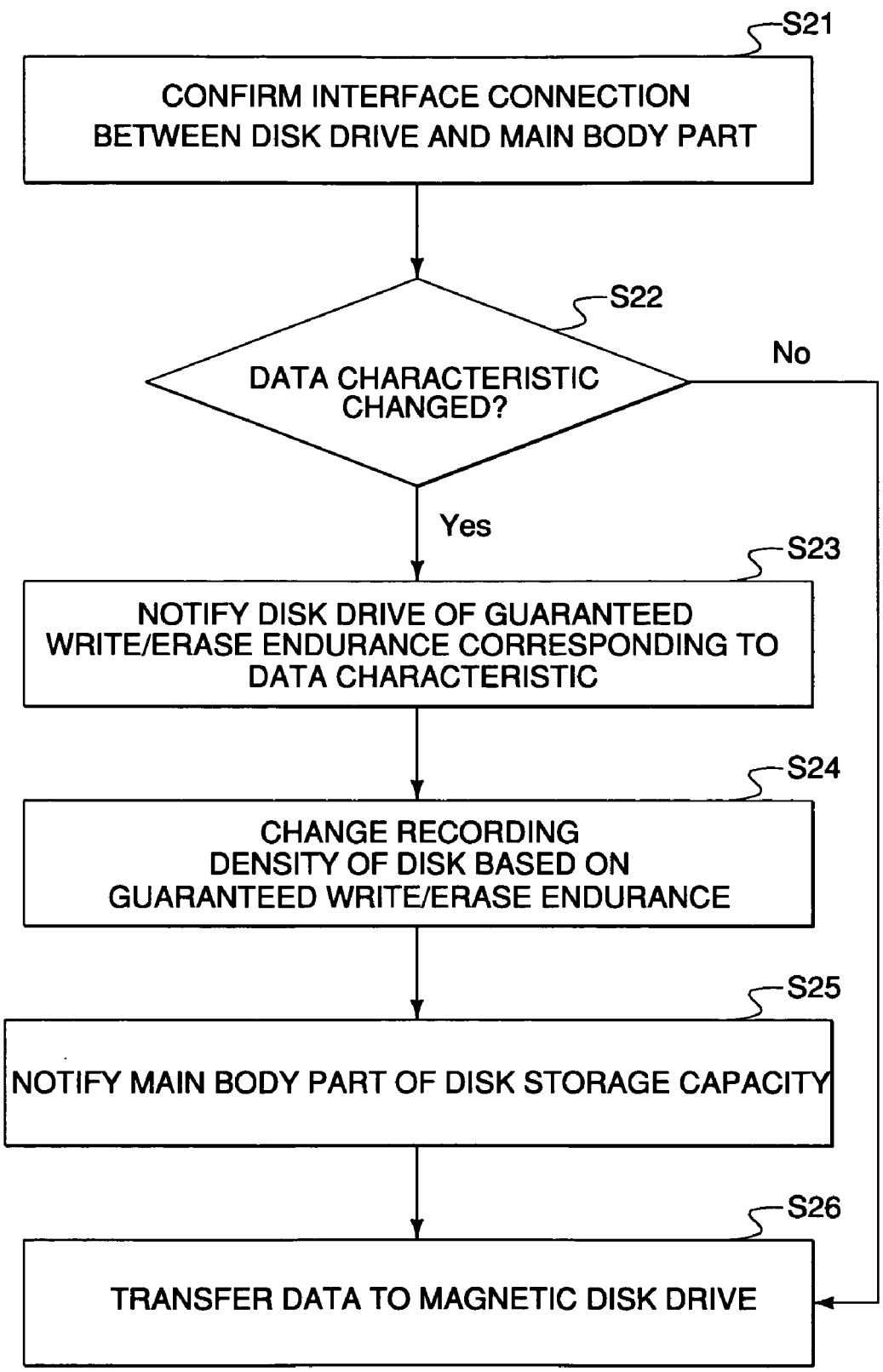
FIG. 12 is a flowchart for explaining still another operation of the information storage unit of FIG. 9.

FIG. 12 is a flowchart for explaining the operation of this embodiment. The process shown in FIG. 12 is carried out by the control part 27 such as a CPU or a separate dedicated processor of the magnetic disk drive 26. In step S21, information is transmitted to and received from the main body part 30 using a standard interface, so as to confirm that the magnetic disk drive 26 is connected to the main body part 30. In step S22 it is determined whether a change is made in the characteristic of the data to be processed by the electronic device 28.

The change in the characteristic of the data is judged based on a change notification from the main body part 30. The main body part 30 may issue the change notification by automatically detecting the change in the characteristic of the data, or issue the change notification in response to the change in the characteristic of the data input to the main body part 30 from an operation part (not shown) of the electronic device 28.

If it is determined that a change is made in the characteristic of the data, a notification of the guaranteed write/erase endurance corresponding to the changed data characteristic is received from the main body part 30 in step S23. The characteristic of the data and the guaranteed write/erase endurance may have a relationship shown in Table 1 below, for example.

TABLE 1

| Data Characteristic | Guaranteed Write/Erase Endurance |
| --- | --- |
| Meta data of file, Log information (file etc. including .log) | 10,000 Times |
| Small-capacity file data during editing (save command from editing software) | 1,000 Times |
| Copy and backup data (Copy command, .bak data) | 100 Times |
| Image and music data (.wmv or .mp3 file) | 10 Times |
| Permanently storing data (case where "final" is included in file name, etc.) | 1 Time |

One type of the data characteristic may be the file name (or data name) given to the data, or the command such as a copy command that is used when recording the data, but it is also possible to judge the data characteristic from secondary information such as the data size and the data transfer rate. Thus, the main body part 30 can notify to the control part 27 of the magnetic disk drive 26 the guaranteed write/erase endurance that depends upon the characteristic of the data based on Table 1.

The guaranteed write/erase endurance may be input to the main body part 30 from the operation part of the electronic device 28. Since the relationship between the track pitch (TPI) and the guaranteed write/erase endurance shown in FIG. 4 and/or the relationship between bits per inch (BPI) and the guaranteed write/erase endurance shown in FIG. 5 are/is stored in the storage part 21 of the magnetic disk drive 26, the recording density of the magnetic disk 10 is set in step S24 based on these relationships when the guaranteed write/erase endurance is notified from the main body part 30. In step S25 the magnetic disk drive 26 notifies the main body part 30 of the storage capacity of the magnetic disk 10 obtained by the set recording density.

In step S26 data is transferred from the main body part 30 to the magnetic disk drive 26. Thereafter, known procedures related to the data transfer process are carried out, such as recording the data on the magnetic disk 10 in the magnetic disk drive 26, and notifying the main body part 30 of the completion of the recording operation.

According to this embodiment, in a case where the required guaranteed write/erase endurance is relatively small, for example, the recording density of the magnetic disk 10 can be increased by a corresponding amount to increase the storage capacity, so that it is possible to easily build the magnetic disk drive 26 that is suited for the characteristic of the data to be processed in the electronic device 28. In other words, it is possible to secure a maximum storage capacity depending on the usage of the magnetic disk drive 26.

In addition, when the data characteristic is changed at an arbitrary time, it is possible to secure a maximum storage capacity for the magnetic disk drive 26 to suit the characteristic of the data to be processed in the electronic device 28 at this arbitrary time (by notifying the magnetic disk drive of the required guaranteed write/erase endurance).

Generally, a write-once type recording medium such as the CD-R is used as a recording medium which stores the data that are written only once. Examples of such data include image data, clinical charts, documents and the like for medical use requiring storage for a predetermined period of time. Some data are required by law to be stored for a predetermined period of time.

The type of data that are rewritten 10 to 100 times include video data, music data and the like, for example. Such data is rarely rewritten or accessed. However, in the case of a hard disk recorder or the like, the video data may be rewritten frequently. In other words, such data may be rewritten once to an infinitely large number of times depending on the manner in which the user wishes to use the data. However, for most users, it is sufficient to set the guaranteed write/erase endurance of approximately 100 times for such data, and it may be regarded that no particular problem will be introduced by this setting.

A flash memory, a DVD-RAM or the like are used as the recording media which store data that are typically rewritten approximately 1,000 to 10,000 times. A demand for recording media for such usage is rapidly increasing, due to the enlarging of the market for the flash memory itself, and the rapid popularization of portable electronic devices such as the portable telephone, MP3 music player, digital camera, PDA, etc.

A value of 1,000, for example, for the number of times the rewriting may be made is not at all a small number if a known head control is carried out so that the recording will not be made a relatively large number of times with respect to the same recording region on the magnetic disk. Hence, when the magnetic disk is used as the recording medium, it may be seen that the usage requiring the guaranteed write/erase endurance to be 100,000 times or greater is the minority usage.

The storage systems that require the data to be updated frequently such as those used in banks and Internet transactions, may have the so-called RAID structure made up of a plurality of magnetic disk drives. In such storage systems, rewriting of log data, such as large-scale log information and meta information of files, occur frequently. But even in these storage systems, the number of times the contents of the individual data is rewritten is relatively small. Accordingly, by setting the guaranteed write/erase endurance to a relatively large value for only the magnetic disk or the recording region on the magnetic disk that records the log information and the meta information, for example, and setting the guaranteed write/erase endurance to a relatively small value for the other magnetic disks or the other recording regions on the magnetic disk, it is possible to increase the storage capacity of the storage system by a corresponding amount.

In addition, when updating a document file in a PC using an application such as Excel and Word, the rewriting of data occurs frequently. However, even in this case, although the frequent rewriting occurs when creating the document file, the rewriting decreases considerably thereafter. Hence, even in the fields that require the guaranteed write/erase endurance to be 100,000 times or greater, the guaranteed write/erase endurance that is actually required is relatively small in many cases. In the case of a document file, for example, it is possible to reduce the guaranteed write/erase endurance from the time when the document file is initially created.

In each of the embodiments of the present invention described above, if the magnetic disk drive includes a plurality of magnetic disks, the setting of the recording density depending on the guaranteed write/erase endurance may be made with respect to each magnetic disk or, with respect to one or a plurality of selected magnetic disks. In addition, the setting of the recording density depending on the guaranteed write/erase endurance may be made with respect to the entire recording region on one magnetic disk or only with respect to a selected recording region. In this case, it is possible to set a different recording density for each recording region having a different guaranteed write/erase endurance on the magnetic disk.

Moreover, the recording technique employed in the present invention is not limited to the perpendicular magnetic recording technique, and the present invention may employ the longitudinal magnetic recording technique (or the in-plane magnetic recording technique).

The present invention has thus been described above with respect to a magnetic disk. It should be understood, however, that the present invention is similarly applicable to magnetic recording media other than the magnetic disk. For example, the magnetic recording medium may have a card-shape, which may have concentric tracks or a spiral track formed thereon.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for setting a recording density of a recording medium, comprising:
   establishing a predetermined relationship between a plurality of guaranteed write/erase endurance values indicating a number of times data can be rewritten on a position on the recording medium and a plurality of recording density values for the recording medium;
   selecting a guaranteed write/erase endurance value for the recording medium;
   determining a recording density value corresponding to the selected guaranteed write/erase endurance value from the predetermined relationship; and
   setting the recording density of the recording medium based on the determined recording density value.

2. The method as defined in claim 1, wherein the recording density is set with respect to a radial direction of the recording medium.

3. The method as defined in claim 2, wherein the recording density values become higher as the guaranteed write/erase endurance values becomes smaller in the predetermined relationship.

4. The method as defined in claim 1, wherein the guaranteed write/erase endurance value is selected from a plurality of guaranteed write/erase endurance values corresponding to a plurality of regions on the recording medium, and the recording density is set with respect to a region on the recording medium corresponding to the selected guaranteed write/erase endurance value.

5. The method as defined in claim 1, wherein the recording density of the recording medium is set during an assembly of the recording medium in a data storage apparatus.

6. The method as defined in claim 1, wherein the recording density of the recording medium is set at an initial start of a data storage apparatus in which the recording medium is provided.

7. The method as defined in claim 1, wherein the recording density of the recording medium is set at an initial start of a data storage apparatus in which the recording medium is provided, and based on a width of a recording head of the data storage apparatus, or widths of the recording head and reproducing head of the data storage apparatus.

8. The method as defined in claim 1, wherein the recording density of the recording medium is set when a characteristic of data to be processed by a data storage apparatus in which the recording medium is provided, changes.

9. Apparatus for setting a recording density of a recording medium, comprising:
   storage means for storing a predetermined relationship between a plurality of guaranteed write/erase endurance values indicating a number of times data can be rewritten on a position on the recording medium and a plurality of recording density values for the recording medium;
   control means for determining a recording density value corresponding to a required guaranteed write/erase endurance value from the predetermined relationship; and
   setting means for setting the recording density of the recording medium based on the determined recording density value.

10. The recording density setting apparatus as defined in claim 9, wherein the recording density is set with respect to a radial direction of the recording medium.

11. The recording density setting apparatus as defined in claim 10, wherein the predetermined recording density values become higher as the guaranteed write/erase endurance values becomes smaller.

12. The recording density setting apparatus as defined in claim 9, wherein the guaranteed write/erase endurance value is selected from a plurality of guaranteed write/erase endurance values corresponding to a plurality of regions on the recording medium, and the recording density is set with respect to a region on the recording medium corresponding to the selected guaranteed write/erase endurance.

13. The recording density setting apparatus as defined in claim 9, wherein the recording density of the recording medium is set during an assembly of the recording medium in a data storage apparatus.

14. The recording density setting apparatus as defined in claim 9, wherein the recording density of the recording medium is set at an initial start of a data storage apparatus in which the recording medium is provided.

15. The recording density setting apparatus as defined in claim 9, wherein the recording density of the recording medium is set at an initial start of a data storage apparatus in which the recording medium is provided, and based on a width of a recording head of the data storage apparatus, or widths of the recording head and reproducing head of the data storage apparatus.

16. The recording density setting apparatus as defined in claim 9, wherein the recording density of the recording medium is set when a characteristic of data to be processed by a data storage apparatus in which the recording medium is provided, changes.

17. The recording density setting apparatus as defined in claim 9, wherein the apparatus comprises a servo track writer.

18. The recording density setting apparatus as defined in claim 9, wherein the apparatus comprises a data storage device.

19. The recording density setting apparatus as defined in claim 9, wherein the apparatus comprises an electronic device having a data storage device.

20. The recording density setting apparatus as defined in claim 9, further comprising means for notifying the control means of the select guaranteed write/erase endurance value.

21. The recording density setting apparatus as defined in claim 9, wherein the setting means is a recording head.

22. The method as defined in claim 1, wherein the recording density is set with respect to a circumferential direction of the recording medium.

23. The recording density setting apparatus as defined in claim 9, wherein the recording density is set with respect to a circumferential direction of the recording medium.

* * * * *